Mar. 20, 1923.

S. GUTHMAN.
PAY ENVELOPE.
FILED DEC. 31, 1921.

Inventor
Sigmund Guthman

By Mason, Fenwick & Lawrence
Attorneys

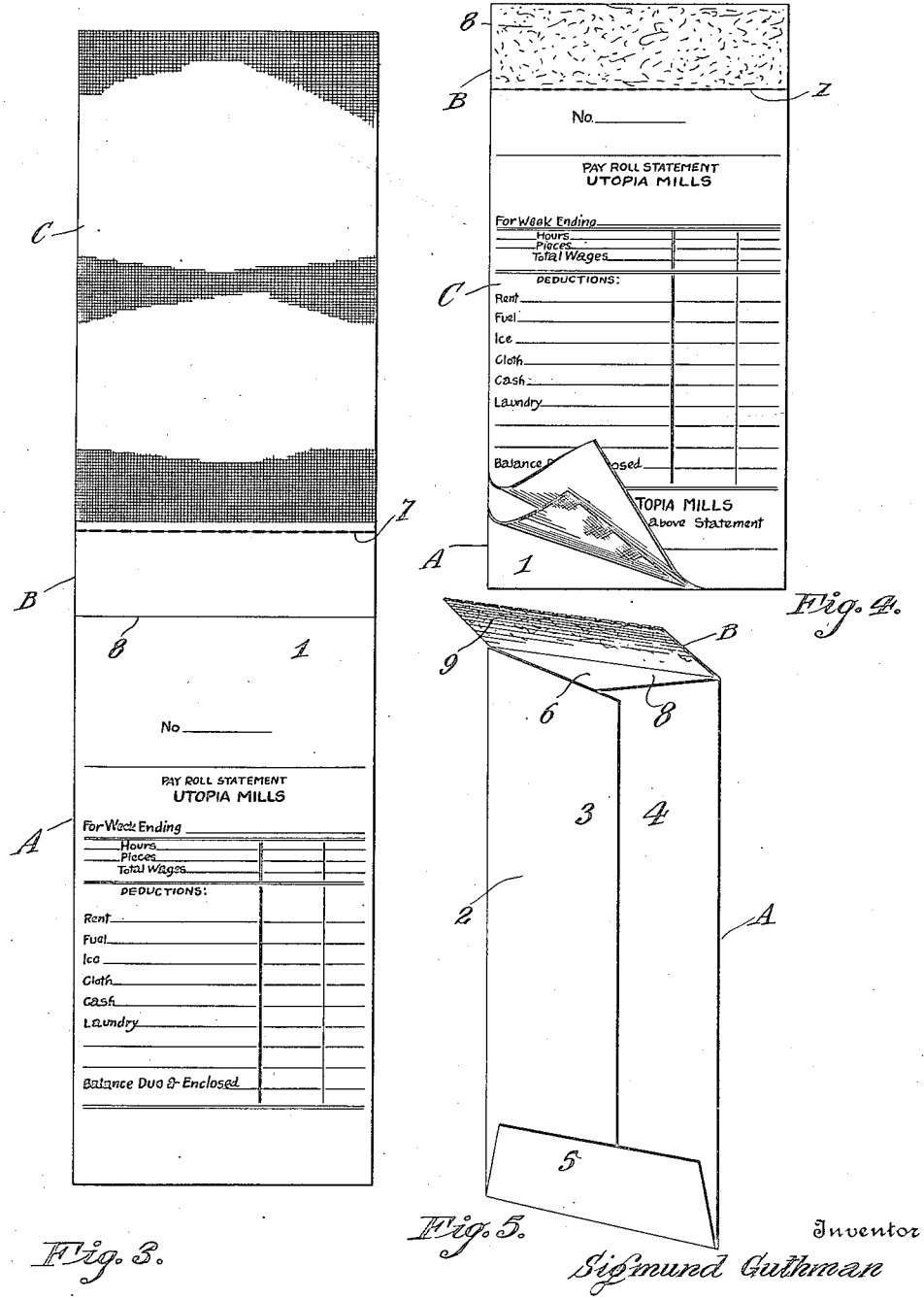

Patented Mar. 20, 1923.

1,449,282

UNITED STATES PATENT OFFICE.

SIGMUND GUTHMAN, OF ATLANTA, GEORGIA.

PAY ENVELOPE.

Application filed December 31, 1921.  Serial No. 526,264.

*To all whom it may concern:*

Be it known that I, SIGMUND GUTHMAN, a citizen of the United States, residing at Atlanta, in the county of Fulton and State of Georgia, have invented certain new and useful Improvements in Pay Envelopes; and I do hereby declare the following to be a full, clear, and exact description of the invention, such as will enable others skilled in the art to which it appertains to make and use the same.

This invention relates to pay envelopes with detachable slip bearing a statement of employee's account.

Objects of the invention are to facilitate preparation of employees' pay accounts; to avoid disputes and questions as to the correctness of the account by providing duplicate records and receipts attached to the envelope, one of which may be detached when the envelope is handed to the employee and filed away by the employer; to save time, printing and material; and to adapt a pay envelope to take the place of a time card of the type inserted in a time clock in order to record the time of arrival and departure of the employee.

The invention consists of a pay envelope and record flap, preferably made in one piece,—of one sheet of paper,—the envelope pocket having, extending from the front panel thereof, a sealing flap and integral with the sealing flap and extending therebeyond a record or statement bearing flap; the face of the front panel of the envelope pocket and the reverse side of said extended record flap bearing corresponding statement forms adapted to register when the sealing flap and record flap are folded into contact with the face of the front panel of the envelope. It may also consist of the described structure of envelope, sealing flap and record flap, in which the record flap has on the reverse face, or that face which is exposed when the sealing and record flaps are folded upon the back panel of the envelope, a time record form made or adapted to be filled in by a time clock.

In so far as I am aware the usual practice in making up the accounts of employees and paying them calls for the preparation of a time card, a statement showing wages earned and deductions debited, a receipt to be signed by the employee for his wages, and an envelope in which the net wages due are inserted. By means of this improvement a time card, an original and duplicate pay statement, an original and duplicate employee's receipt and a pay envelope are all formed in one. The original statement and receipt appears upon the reverse of the extension flap referred to, the time record appears upon the obverse of said flap and a carbon duplicate of the pay statement and employee's receipt appears upon the face of the front panel of the envelope.

In case it is not desired to use the envelope as a time card, the obverse face of the record flap may bear a coating of carbon or other transfer pigment so that when said record flap is folded over against the face of the front panel of the envelope the original entries when made thereon and the signature of the workman in acknowledging payment will be transferred to the envelope. In case the time record is printed on the obverse of the extension record flap it is contemplated that a carbon sheet shall be inserted between the face of the envelope and the record flap so that the data written on the reverse of the record flap will at the same time be duplicated on the face of the envelope.

In using the envelope and record flap described the flap bearing the original statement of earnings and deductions over the employee's signature or acceptance may be detached and filed away by the employer, the employee retaining a carbon copy thereof on his pay envelope. There is thus no chance of discrepancy between the original statement in possession of the employer and the duplicate thereof in possession of the employee. When an employee accepts his pay in the envelope he signs a receipt properly made out showing gross amount of wages, amount of deductions and net wages enclosed in the envelope. There can be no further opportunity for dispute after this receipt has been signed, all complaints and explanations having been presumably made before signing.

In the accompanying drawings,

Figure 1 represents the reverse side or back of an envelope, sealing flap and extension record sheet;

Figure 2 shows the face or obverse side of the device shown in Figure 1;

Figure 3 shows a pay envelope face up with the extension flap beyond the sealing portion coated with transfer carbon;

Figure 4 illustrates a pay envelope face up with the extension flap folded to expose the statement thereon, and a carbon sheet interposed between the face of the envelope and the flap, and Figure 5 is a view of the rear side of a pay envelope from which the record sheet has been detached.

Although the envelope of this invention is intended to be made from one sheet of paper, it will be considered as consisting of three parts, to wit, the pocket portion or envelope body A, the sealing flap B and the extension record flap C. The pocket portion A is of the usual type of pay envelope consisting of a front panel 1 and a back panel 2. In the form shown the back panel 2 consists of two flaps 3 and 4, sealed together between the edges of the pocket, and an end sealing flap 5 folded over at what may be called the bottom of the envelope and sealed permanently, thus forming with the front panel 1 a pocket having an open mouth 6 for the insertion of a pay check or cash. Extending from what is here called the upper end of the front or obverse panel 1 of the envelope is a sheet or flap of the same width as said panel 1 and which may be substantially of the same length, or a little shorter, if desired. This extension sheet or flap forming a continuation of the front or obverse panel 1 beyond the mouth of the envelope pocket, may be weakened at the line 7, the portion thereof between the weakened line 7 and the fold line 8 constituting a sealing flap B, which is preferably coated with a water-soluble adhesive coating 9, and may be folded back and caused to adhere to the back panel of the envelope pocket after the record flap C, which extends beyond the weakened line 7, has been detached.

The said record flap or sheet C bears, on the reverse side thereof at the top (when folded upon the front of the envelope pocket in position to be read) adjacent to the weakened line 7, a space for the pay roll number of the employee (here indicated as No. 61) and beneath the pay roll number a line for his name. Underneath the name there may appear the words "Pay roll statement" associated with the name of the employer. Beneath the employer's name there may be a space for recording the wage period. Beneath that there may be a space for the hours of labor performed by the employee, or, if he has been on piece work, for the number of pieces completed. There may also be a place for the total amount of wages earned. Beneath, in the space marked "Deductions," there may be printed a number of items indicating values, advanced and debited against the employee's wages. In the example shown there are provided spaces for deductions for rent, fuel, ice, cloth, cash advanced, or laundry charges, paid for or furnished by the employer. At the bottom of the statement is a space for noting the balance due and enclosed in the pocket of the envelope; while beneath the statement is a space for the signature of the employee acknowledging receipt of the net wages handed to him in the envelope.

On the face of the front panel of the envelope there is a duplicate of the form of statement printed on the reverse of the record flap or sheet; and the size and disposition of the forms on the face of the pay envelope and on the reverse of the record flap are such that, when the record flap is folded on the fold line 8 into contact with the face panel of the envelope, the forms will register. When the statement is prepared in the office of the employer it will be made out on the original record flap or sheet of the pay envelope, said flap or sheet having been previously folded over into contact with the face panel of the envelope and at the same time a transfer copy of the entries on the reverse of the record sheet will be impressed upon the face of the pay envelope. This transfer of the record may be accomplished by inserting an ordinary sheet of carbon over the face of the envelope, folding the record sheet over onto the carbon sheet and writing the data on the record sheet in the usual manner. This will be the practice when, as before described, the time record is printed on the obverse of the record sheet. If no time record is kept on the obverse of the record sheet the obverse of said record sheet may have a coating of transfer pigment, thus affording the advantage that the transfer sheet is always in position ready for use and avoiding any inadvertence of entering the data on the reverse of the record sheet without placing a carbon sheet between it and the face of the envelope pocket.

In Figure 2 is shown an ordinary time card form printed on the obverse of the record sheet. The envelope is intended to be, when folded, of such proportions and size as to be readily insertible in a time clock recorder so that the mechanism of the time clock will impress in the space provided the times of entry and departure of the employee every day of the week exactly as on the ordinary time card. Combination envelopes of this type may be utilized and kept during the wage period precisely as time cards are usually kept.

When the record of the time clock is impressed on the obverse of the record sheet it will be apparent that, after the payroll has been made out and each individual record sheet filled and after the employee has signed his name in receipt for the pay, there remains on one single slip a complete record of the time, wages and deductions, acknowledged by the signature of the employee, which may be filed away by the employer, in order to keep in most convenient form a complete record of every individual employee.

These envelopes may be made to fit any standard size time clock, but are in practice made in two sizes, namely 3¾ inches by 6 inches, 3¼ inches by 5½ inches. They can, however, be made of any special size suitable to the needs and purposes of any employer. The principles of the invention are not affected by changes of size and proportions, it being only essential with respect to the time record that the form shall be suited to the particular time clock used. With respect to the wage and deductions form it is only necessary that the envelope and extension flap be so constructed that, when the flap is folded over onto the face panel of the envelope, the corresponding forms shall register.

Having described my invention what I claim and desire to secure by Letters Patent is:

In a combined pay envelope and employee's wage record, an envelope pocket having a sealing flap extended from its front panel, and an extension flap continuing beyond the sealing flap, the reverse face of said extension flap bearing the pay statement of an employee, and the front panel of said envelope pocket bearing a corresponding statement in position to register with the said statement on the reverse of the record sheet when said record sheet and sealing flap are folded onto the face panel of the envelope pocket whereby a receipted statement written on the extension flap may be duplicated on the face of the envelope.

In testimony whereof I affix my signature.

SIGMUND GUTHMAN.